US006598947B2

(12) United States Patent
Hannah

(10) Patent No.: US 6,598,947 B2
(45) Date of Patent: Jul. 29, 2003

(54) WHEELCHAIR WHEEL COVER

(75) Inventor: Roland R. Hannah, Long Beach, CA (US)

(73) Assignee: Hannah's Miracle Shoe, Inc., So. Jordan, UT (US)

( * ) Notice: Subject to any disclaimer, the term of this patent is extended or adjusted under 35 U.S.C. 154(b) by 7 days.

(21) Appl. No.: 09/940,009

(22) Filed: Aug. 27, 2001

(65) Prior Publication Data

US 2003/0037852 A1 Feb. 27, 2003

(51) Int. Cl.[7] .................................................. B60C 5/00

(52) U.S. Cl. ........................ 305/170; 305/173; 305/185; 305/208; 305/219

(58) Field of Search ................................ 152/170, 173, 152/174, 175, 176, 177, 185, 208, 209.1, 217, 219; 206/304.1, 304.2

(56) References Cited

U.S. PATENT DOCUMENTS

| | | | | | |
|---|---|---|---|---|---|
| 710,562 | A | * | 10/1902 | Caters | 152/173 |
| 1,029,263 | A | * | 6/1912 | Bingham et al. | 152/170 |
| 1,156,080 | A | * | 10/1915 | Hopkinson | 206/304.1 |
| 1,243,657 | A | * | 10/1917 | Coan | 152/173 |
| 1,323,976 | A | * | 12/1919 | Gates | 152/175 |
| 1,388,264 | A | * | 8/1921 | Keavey | 152/170 |
| 1,519,810 | A | * | 12/1924 | Ferrari | 152/173 |
| 1,689,438 | A | * | 10/1928 | Jellison | 206/304.1 |
| 1,696,009 | A | * | 12/1928 | McCormick | 206/304.1 |
| 4,126,169 | A | * | 11/1978 | Magnuson et al. | 206/304.1 |
| 4,328,053 | A | * | 5/1982 | Medlin, Jr. | 206/304.1 |
| 5,239,396 | A | * | 8/1993 | Thompson | 359/1 |
| 6,273,159 | B1 | * | 8/2001 | Page | 152/170 |

* cited by examiner

*Primary Examiner*—S. Joseph Morano
*Assistant Examiner*—Long Bao Nguyen
(74) *Attorney, Agent, or Firm*—Workman, Nydegger & Seeley

(57) ABSTRACT

A cover suitable for use in conjunction with a wheelchair wheel. The cover includes a durable nylon fabric and includes a barrier and a cover portion, the barrier being interposed between an inner surface of the cover portion and the tread and sidewalls of the wheel so that foreign matter present on the wheel does not contaminate or otherwise harm any persons or surfaces with which the covered wheel may come into contact. The cover further includes an outer surface and first and second edges. A plurality of straps attached to the first edge of the cover, and configured to be removably attached to the second edge of the cover, permit the cover to be readily attached to, and detached from, the wheel. Finally, a plurality of lateral seams on the outer surface of the cover facilitate traction when the wheelchair passes over relatively smooth surfaces.

34 Claims, 3 Drawing Sheets

WHEELCHAIR WHEEL COVER

CROSS-REFERENCE TO RELATED APPLICATION

Not applicable.

BACKGROUND OF THE INVENTION

1. The Field of the Invention

The present invention relates generally to protective covers for use in facilitating containment of foreign materials. More particularly, embodiments of the present invention concern wheel covers that are effective in substantially preventing foreign material, with which a wheelchair may come into contact, from contaminating surfaces and/or harming persons that the wheelchair wheels may contact.

2. Related Technology

Wheelchairs provide an important degree of freedom to those who might otherwise be confined to a bed or stationary chair. Without wheelchairs, such persons would be heavily reliant on the availability of another person, or persons, to assist them in reaching a particular destination and/or performing a particular task that requires a certain degree of mobility. Depending upon their relative health and physical condition, some users may only require the use of a wheelchair for a short period of time, while others with more specialized needs may be confined to a wheelchair indefinitely. In either case, wheelchair users face a variety of unique challenges and obstacles.

Many of the challenges faced by wheelchair users relate to the locations and environments in which such users are compelled to operate their wheelchairs. For example, a typical wheelchair user may operate his or her wheelchair in public buildings, private buildings, parks, parking lots, sidewalks and streets. When outside, wheelchair users often confront a variety of weather conditions including rain, snow, slush, and hail, as well as various weather related conditions such as puddles and mud.

Of particular concern to many users are the various foreign and hazardous materials with which the wheelchair wheels typically come into contact when the wheelchair is used outside. Materials frequently encountered by wheelchair users include, among other things, gum, animal waste, nails, glass, staples, food, dirt, water, mud, tar, gasoline, and oil. While such materials can often be readily avoided by pedestrians, the relatively limited mobility and maneuverability of a person in a wheelchair often makes such unpleasant encounters inevitable for him or her.

Encounters with materials such as those enumerated above are problematic for a variety of reasons. This is due in large part to the fact that many wheelchair users use their hands to rotate, and brake, the wheels of the wheelchair, so as to control the speed and direction of travel of the wheelchair. As the result of such contact with the wheels however, the hands of the user frequently come into direct contact with the materials over which, or through which, the wheels have passed. Thus, encounters with animal waste, for example, pose a significant health risk to the user of the wheelchair.

Other materials pose a threat to the user as well. For example, sharp objects such as nails, glass, or staples may become embedded in the tread and/or sidewalls of the wheelchair wheels. Such embedded objects can cause cuts and bruises on the hands of the user, and may also contribute to infections and other conditions. Materials such as food and gum may also pose a health hazard to the user because they typically contain a variety of germs as a result of their contact with the ground. Food and gum are also problematic because they impair the operation of the wheelchair by causing the hands of the user to stick to the wheels.

While materials encountered by wheelchair users present a variety of serious concerns for such users, those materials pose other problems as well. For example, when a wheelchair user desires to enter a hospital, care facility, house, or other building, it is typically the case that at least some of the materials present on the wheels of the wheelchair are deposited on the floors, carpets, and/or walls of the building as the user maneuvers and/or propels his or her wheelchair. The presence of such materials is particularly problematic in buildings such as hospitals and care facilities where maintenance of cleanliness and sanitary conditions is of paramount importance.

Furthermore, removing materials such as gum or oil, for example, from carpeting or floors can be expensive and time consuming. Similarly, sharp objects, such as glass and nails, embedded in the wheels of the wheelchair, may damage wood and vinyl flooring materials, necessitating expensive repairs, or replacement.

Additionally, because small children and pets may have relatively more intimate contact with floors and carpeting than would an adult, such children and pets may be more likely to come into contact with foreign matter deposited by the wheels of the wheelchair. As noted earlier, contact with such foreign matter can cause infections and injuries, among other things.

In view of the foregoing problems, and others, a need exists for a wheel cover that is effective in substantially containing foreign materials present on, or in, the wheel with which the cover is employed, and that can be readily attached to, and removed from, the wheel. Further, the wheel cover should also be able to substantially prevent foreign materials from contacting the wheel.

BRIEF SUMMARY OF VARIOUS FEATURES OF THE INVENTION

The present invention has been developed in response to the current state of the art, and in particular, in response to these and other problems and needs that have not been fully or adequately addressed. Briefly summarized, embodiments of the present invention provide a wheel cover that substantially contains foreign matter present in or on the covered wheel so as to prevent injury to the user and to reduce the incidence of infections, damage, and other undesirable consequences resulting from the presence of such foreign matter.

Embodiments of the present invention are particularly well suited for use in conjunction with the wheels of a wheelchair. However, embodiments of the present invention are likewise suitable for use in any application where it is desired to contain foreign matter present on one or more wheels of a wheeled vehicle or similar device that may operate both indoors and outdoors and/or that may require physical contact between a person and the wheels of the device.

In one embodiment of the invention, a wheel cover made of durable nylon fabric is provided that is dimensioned so as to enclose a substantial portion of the tread and sidewalls of the wheel to which the wheel cover is intended to be attached. The wheel cover includes a cover portion to which a plurality of straps, each having first and second ends, are attached. The respective first ends of the straps are attached to a first edge of the cover portion. The respective second ends of the straps are configured to be removably attached to a second edge of the cover portion by, for example, a hook-and-loop type fastening system. In this way, the wheel covers can be readily attached to the wheels of the wheelchair, prior to entering or exiting, as applicable, a building for example, and can be readily removed from the wheels upon exiting or entering, as applicable, the building.

The cover portion of the wheel cover includes inner and outer surfaces. A barrier interposed between the inner surface and the tread and sidewalls of the wheel serves to facilitate containment of foreign material present on the wheels, and thereby prevents contamination of, or harm to, persons or surfaces with which an outer surface of the wheel cover comes into contact. When used in an alternative manner, the wheel cover prevents foreign material from contacting the wheel so that when the wheel cover is removed, the wheel is clean and thus poses no threat of damage or injury to any persons or surfaces with which the wheel may subsequently come into contact.

Additionally, the nylon is substantially puncture resistant and thus serves to prevent sharp objects embedded in the wheels from damaging floors and walls and/or injuring the user. The outer surface of the wheel cover includes a plurality of lateral seams that facilitate traction and maneuverability of the wheelchair when the wheel cover passes over smooth surfaces.

Other exemplary features of embodiments of the present invention pertain to the fabric construction of the wheel covers. For example, because the wheel covers may be made of a flexible nylon material, the wheel covers are not injurious to easily damaged materials such as wood or vinyl flooring. Further, the flexibility of the nylon wheel covers permits them to be folded and compactly stowed in a suitable location, and also allows the wheels of the wheelchair to roll readily along a variety of surfaces. Finally, the fabric construction of the wheel covers permits them to be readily laundered or otherwise cleaned.

These and other features and advantages of the present invention will become more fully apparent from the following description and appended claims.

BRIEF DESCRIPTION OF THE DRAWINGS

In order that the manner in which the above-recited and other advantages and features of the invention are obtained, a more particular description of the invention briefly described above will be rendered by reference to specific embodiments thereof which are illustrated in the appended drawings. Understanding that these drawings depict only typical embodiments of the invention and are not therefore to be considered limiting of its scope, the invention will be described and explained with additional specificity and detail through the use of the accompanying drawings in which.

DETAILED DESCRIPTION OF VARIOUS EMBODIMENTS OF THE INVENTION

Reference will now be made to figures wherein like structures will be provided with like reference designations. It is to be understood that the drawings are diagrammatic and schematic representations of various embodiments of the invention, and are not to be construed as limiting the present invention, nor are the drawings necessarily drawn to scale.

Figure 1:
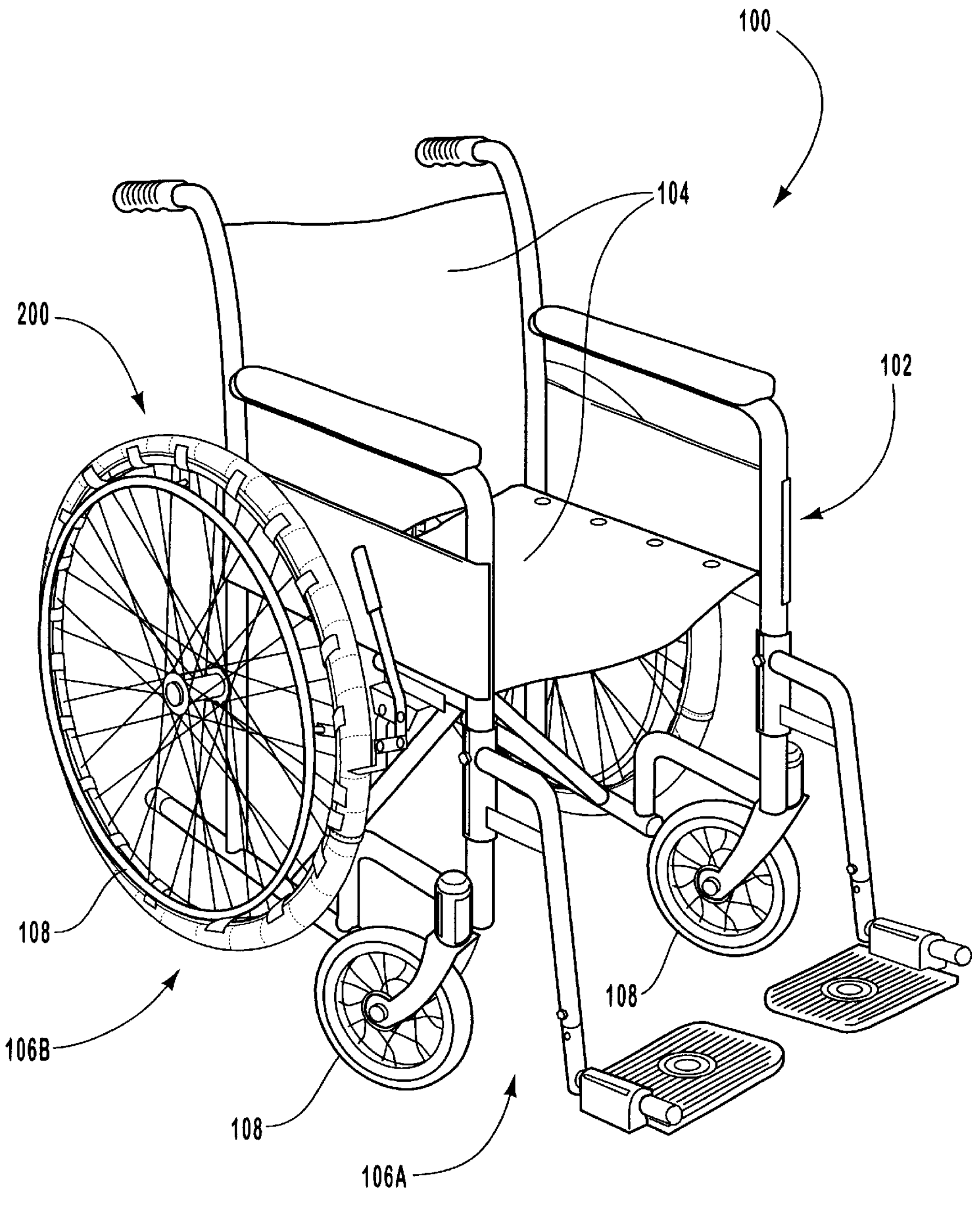
FIG. 1 illustrates an exemplary operating application for embodiments of the present invention, and specifically illustrates a wheelchair that includes an embodiment of a wheel cover.

Reference is first made to FIG. 1, wherein a wheelchair is indicated at 100. In general, wheelchair 100 includes a frame 102 to which is attached a seat 104 wherein a user resides when operating wheelchair 100. Additionally, a front wheel set 106A and a rear wheel set 106B, are provided which are likewise attached to frame 102. Wheelchair 100 may comprise a motorized wheelchair, or may alternatively comprise a wheelchair of the type that requires the user to manually rotate the rear set of wheels in order to propel and steer the wheelchair.

Note that while some embodiments of the invention are especially well suited for use in conjunction with various types of wheelchairs, such as wheelchair 100, embodiments of the present invention are generally suitable for use in any application where it is desired to substantially contain, or otherwise substantially neutralize particular effects of, foreign matter present on one or more wheels of a wheeled vehicle or similar device that may operate both indoors and outdoors and/or that may require physical contact between a person and the wheels of the device. By way of example, alternative embodiments of the present invention are suitable for use with forklifts and various man lift devices, such as "cherry pickers," both of which are often required to operate indoors as well as outdoors.

Alternatively, embodiments of the invention may likewise be employed in applications where it is desired to prevent foreign matter from contacting the wheels in the first instance. Thus, embodiments of the invention may be used to protect a clean wheel from subsequent contamination by foreign material. In this exemplary application, foreign material encountered by the covered wheel will contact only the wheel cover and not the wheel. Prior to entering an area where cleanliness is desired, a home, hospital or care facility for example, the dirty cover can then be removed, and may be laundered as necessary or desired.

It should be noted that the foregoing applications of embodiments of the present invention are exemplary only and should, accordingly, not be construed to limit the scope of the invention in any way.

With continuing reference to FIG. 1, the illustrated embodiment of wheelchair 100 further comprises a wheel cover 200 for each wheel 108 in front wheel set 106A, and rear wheel set 106B. Note that for the purposes of the present discussion, wheel 108 will be referred to in the singular, but may include one or both of the wheels in front wheel set 106A and/or one or both of the wheels in rear wheel set 106B.

In general, wheel cover 200 is removably attachable to wheel 108 and serves to substantially contain, or otherwise substantially neutralize particular effects of, such foreign matter as may be present on, or proximate to, one or more selected portions of wheel 108, wherein such selected portions may include, but are not necessarily limited to, tread 108A, sidewalls 108B, and/or rim 108C of wheel 108.

Alternatively, embodiments of wheel cover 200 may be used to protect one or more selected portions of a clean wheel from contact with foreign matter, thereby extending the service life of the wheel with which wheel cover 200 is employed. Note that wheel 108 is exemplary of the wheel configurations with which embodiments of wheel cover 200 may be employed and should, accordingly, not be construed to limit the scope of the invention in any way.

Figure 2:
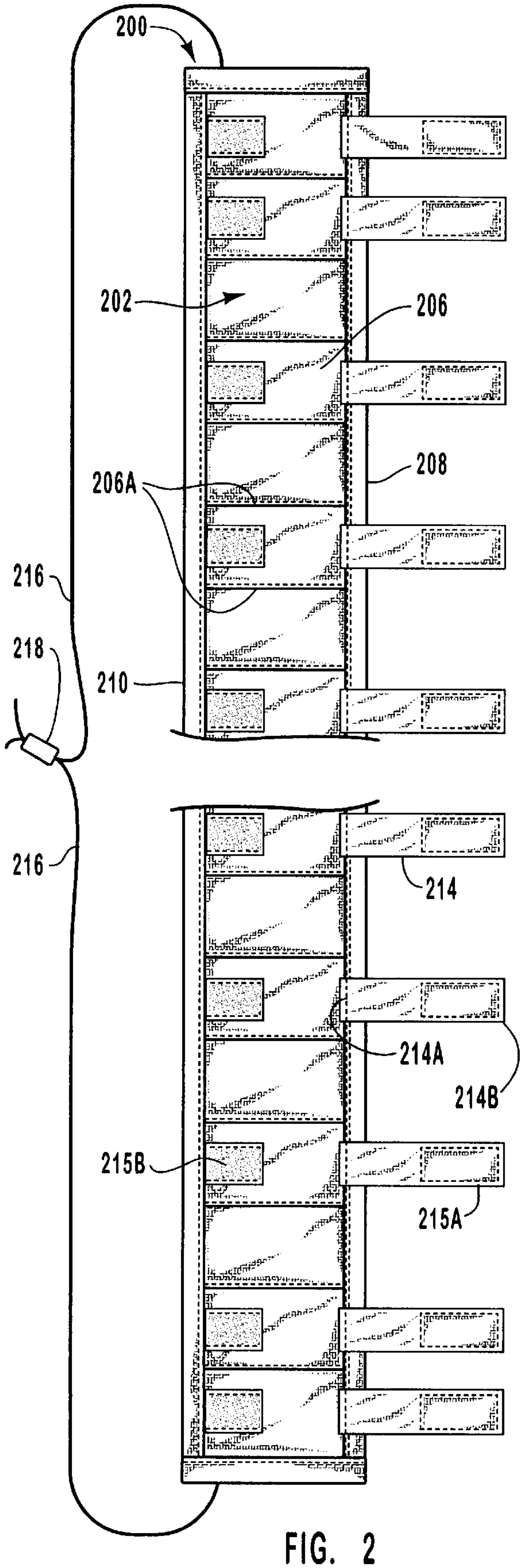
FIG. 2 is a top view illustrating various features of the outside of an embodiment of the wheel cover.
Figure 3:
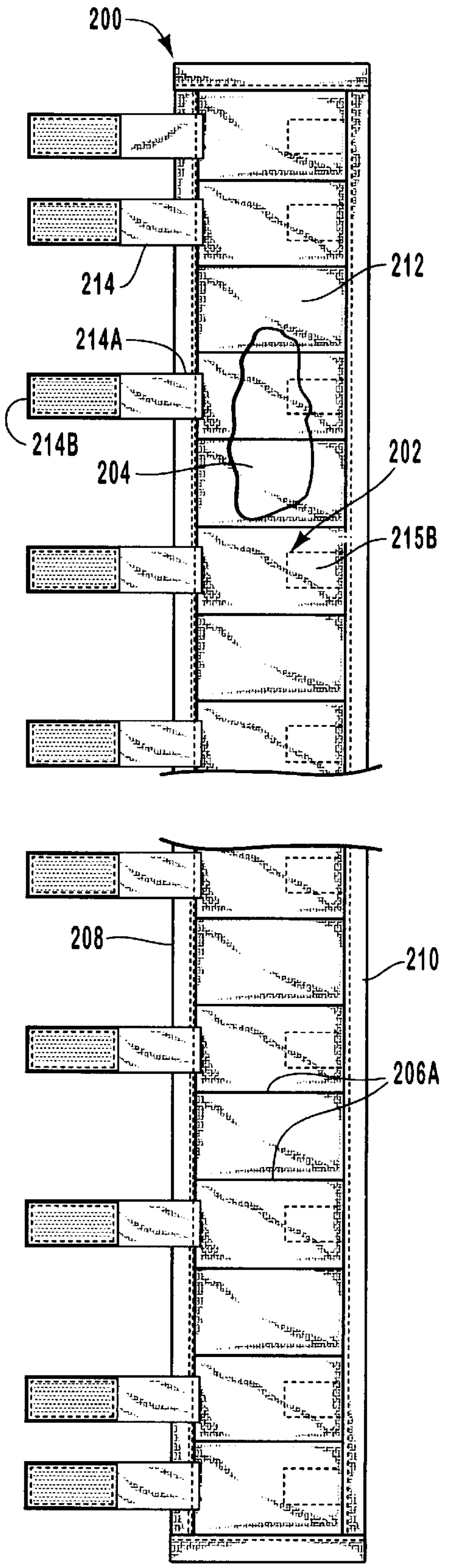
FIG. 3 is a bottom view illustrating various features of the inside of an embodiment of the wheel cover.

Directing attention now to FIGS. 2 and 3, details are provided regarding various features of an embodiment of wheel cover 200. In general, wheel cover 200 is dimensioned so as to enclose a substantial portion of tread 108A and sidewalls 108B of wheel 108, and comprises a material such as a fabric made of woven nylon which is light in weight yet relatively strong. Such fabric wheel covers 200 are advantageous because, for example, they can be manufactured relatively inexpensively.

While nylon is used in some embodiment of the invention, fabric materials other than nylon may be employed as well. In fact, any other materials or combinations of materials having properties consistent with the functionality and features of wheel cover 200 may be employed.

The use of nylon fabric, for example, implicates a variety of useful features. By way of example, the relatively soft texture of wheel cover 200 precludes the possibility of damage to surfaces over which wheel 108 (not shown) passes. Further, wheel cover 200 can be readily laundered, or otherwise cleaned, when the need arises. Additionally, wheel cover 200 is resistant to penetration by nails, glass and other sharp objects as may be embedded in wheel 108. Alternatively, where wheel cover 200 is used in conjunction with a clean wheel 108, wheel cover 200 serves to help protect wheel 108 from damage by such sharp objects. Finally, wheel cover 200 may be provided in any of a variety of different colors, or color combinations, as required to suit a particular application, or to suit the desires of the user.

With continuing attention to various features of wheel cover 200, a cover portion 202 is provided that includes an inner surface 204, an outer surface 206, a first edge 208 and a second edge 210. The aforementioned arrangement is exemplary however, and wheel cover 200 generally may be configured in any way that is consistent with the functionality and features disclosed herein. By way of example, some embodiments of wheel cover 200 feature a cover portion 202 that is substantially continuous, while other embodiments of wheel cover 200 feature a cover portion 202 having first and second ends removably attachable, such as by hook-and-loop type fasteners, to each other. Yet other embodiments of wheel cover 200 feature a cover portion 202 having opposing first and second ends unattached to each other, but which are disposed proximate each other when wheel cover 200 is installed about wheel 108.

Further, in some alternative embodiments, cover portion 202 may, instead of comprising a unitary, or one piece, construction, comprise a plurality of discrete sections removably attached to each other in an end-to-end configuration, such as by a hook-and-loop type fastener, so that a user can readily customize at least the overall length of cover portion 202 to fit a particular wheel by the simple expedient of attaching together a selected number of such discrete sections.

With continuing reference to various features of the illustrated embodiment, at least some embodiments of the invention include a barrier 212 that is substantially waterproof and comprised of plastic or rubber and arranged to be interposed between inner surface 204 and selected portions of wheel 108, such as tread 108A and sidewalls 108B, when wheel cover 200 is attached to wheel 108. Of course, depending upon the application, barrier 212 may be located other than between inner surface 204 and wheel 108. By way of example, barrier 212 may, in some instances, be disposed on outer surface 206. In yet other embodiments, barrier 212 may be interposed between inner surface 204 and outer surface 206. Generally then, barrier 212 may be located wherever the requirements of a particular application may dictate, and the aforementioned arrangements should, accordingly, not be construed to limit the scope of the invention in any way.

In some embodiments of the invention, barrier 212 simply comprises a suitable coating applied to inner surface 204 of cover portion 202. In various alternative embodiments, barrier 212 comprises a discrete layer of waterproof material sewn, bonded, glued, or otherwise attached, to inner surface 204 of cover portion 202. In yet other embodiments, barrier 212 may be integral with cover portion 202.

Finally, barrier 212 may, depending upon the requirements of a particular application, be selected from those materials resistant to penetration and/or degradation by a variety of substances other than, or in addition to, water or water based substances, wherein such other substances may include, but are not limited to, petroleum products such as oil, tar, and gasoline.

Thus, as contemplated herein, "barrier" generally refers to those features or structures calculated to have a particular effect with respect to one or more types of foreign material that may be present on, or embedded in, wheel 108. Such functionality is also useful in those instances where wheel cover 200 is used to protect a clean wheel 108 from contact with foreign matter. Thus, as discussed herein, one such exemplary effect is the prevention of the passage of liquids from wheel 108 through outer surface 206 of cover portion 202, or through outer surface 206 of wheel cover 200 to wheel 108.

With more specific reference now to outer surface 206, some embodiments of the invention include an outer surface 206 having a plurality of seams 206A disposed in a substantially lateral arrangement with respect to the longitudinal aspect of cover portion 202. Generally, seams 206A facilitate, among other things, improved traction for wheels 108 (not shown) as wheels 108 move along smooth surfaces such as vinyl flooring or wood floors. Various other arrangements of seams 206A may likewise be employed. For example, seams 206A may alternatively be employed in a herringbone type arrangement, or in various other arrangements. In general, the size, number, spacing, configuration, and arrangement of seams 206A can be adapted as necessary to suit a particular application.

With respect to seams 206A, such seams comprise one exemplary implementing structure which serves as a means for facilitating traction. Among other things, the means for facilitating traction serves to at least partially reduce slippage of the wheel with respect to an operating surface. However, various other structure(s) may alternatively be employed to provide the functionality disclosed herein. For example, a plurality of pads 206B, made of rubber or other suitable materials, may be attached at intervals to outer surface 206. Further, pads 206B may also include protrusions, grooves, or other features which aid in implementing the traction functionality of pads 206B. As in the case of seams 206A, the size, number, spacing, arrangement, and configuration of pads 206B may be adapted as necessary to suit the requirements of a particular application. In one alternative embodiment, pad 206B comprises a substantially continuous strip composed of rubber, for example.

In view of the foregoing, it should be understood that the structural configurations herein are presented solely by way of example and should not be construed as limiting the scope of the present invention in any way. In general, any structure (s) effective in implementing the functionality of seams 206A or pads 206B may be employed.

With continuing reference now to FIGS. 2 and 3, wheel cover 200 further includes a plurality of straps 214 each having a respective first end 214A and a respective second end 214B. Each of first ends 214A are attached to first edge 208 of cover portion 202, and each second end 214B is configured to be removably attached to second edge 210 of cover portion 202. In one embodiment of the invention, second ends 214B and second edge 210 comprise, respectively, mating portions 215A and 215B of a hook-and-loop type fastener, or similar touch type fasteners. Variables such as the number, size, spacing, and arrangement of straps 214 may be varied as required to suit a particular application and/or wheel geometry. Note that in one alternative embodiment, straps 214 and first ends 214A are integral with cover portion 202.

With respect to straps 214 and the associated hook-and-loop type fasteners, such straps comprise one exemplary structure which serves as a means for removably attaching cover portion 202 to wheel 108. However, various other structures may alternatively be employed to provide such functionality. For example, a plurality of elastic straps, each having a hook at one end adapted to engage a respective corresponding hook on cover portion 202, may be employed to removably attach cover portion 202 to wheel 108.

As another example, where wheel cover 200 is to be employed with a wheel 108 that is configured in a way that precludes the possibility of passing straps from one sidewall to the other, elastic strips placed longitudinally along first edge 208 and/or second edge 210 permit wheel cover 200 to be properly installed and positioned about wheel 108. As an alternative to such elastic strips, wheel cover 200 may employ drawstrings disposed proximate to first edge 208 and second edge 210 so that wheel cover 200 may be secured in position by simply tightening the drawstrings. Such alternative arrangement also includes a suitable cinching device, a barrel slide for example, for preventing further movement or loosening of the drawstrings until such time as it is desired to remove wheel cover 200 from wheel 108.

In view of the foregoing, it should be understood that the structural configurations herein are presented solely by way of example and should not be construed as limiting the scope of the present invention in any way. In general, any structure (s) effective in removably attaching cover portion 202 to wheel 108 may be employed.

Figure 4A:
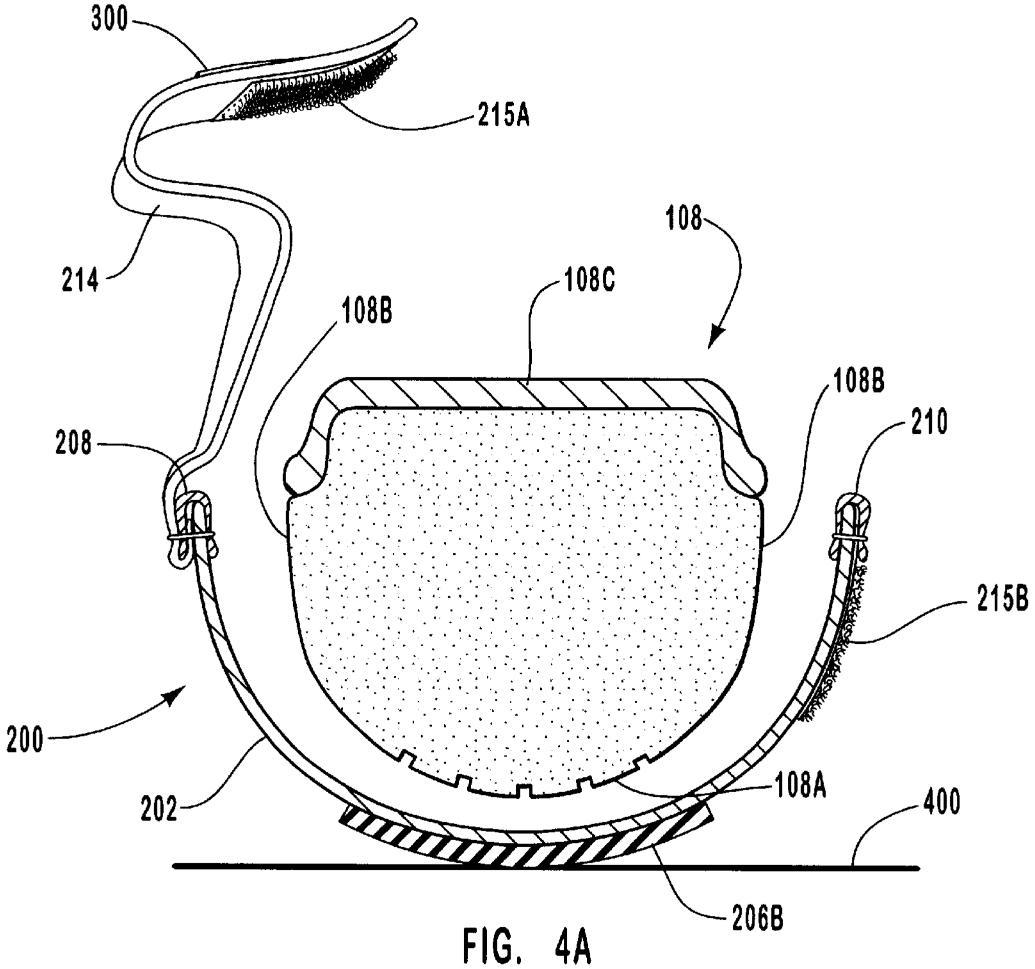
FIG. 4A is a section view through an exemplary wheel illustrating the orientation embodiment of the wheel cover with respect to the exemplary wheel.
Figure 4B:
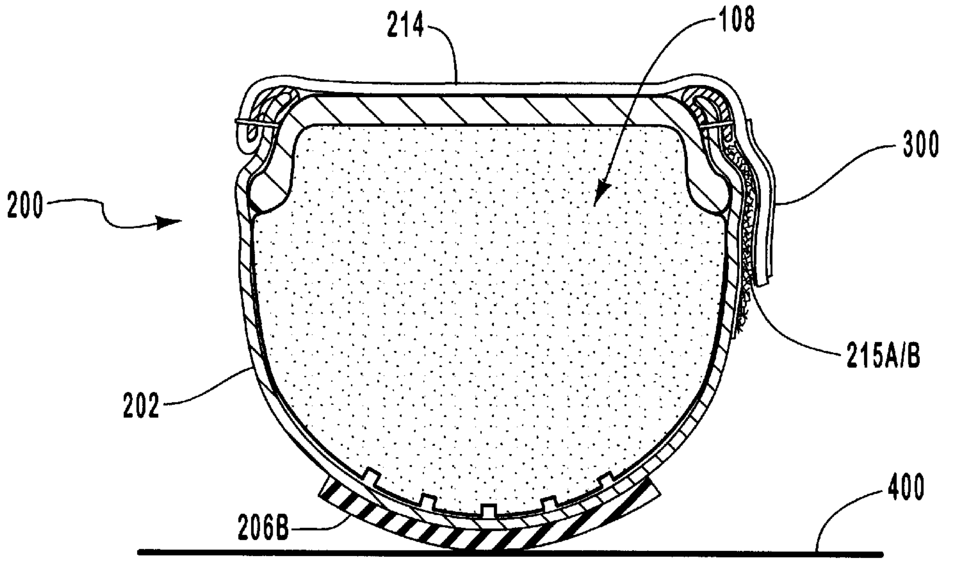
FIG. 4B is a section view through an exemplary wheel illustrating an embodiment of the wheel cover attached to the exemplary wheel.

Directing attention now to FIGS. 4A and 4B, details are provided regarding various additional features of an embodiment of wheel cover 200. In FIG. 4A, the illustrated embodiment of wheel cover 200 is shown positioned about, but unattached to, wheel 108. As indicated in FIG. 4B, wheel cover 200 is dimensioned so as to enclose a substantial portion of tread 108A and sidewalls 108B of wheel 108. However, one or more dimensions of wheel cover 200 may be adjusted to suit a particular application and/or wheel geometry.

In the embodiment of wheel cover 200 illustrated in FIGS. 4A and 4B, one or more reflectors 300 are attached to wheel cover 200 so as to provide enhanced visibility of wheelchair 100 (not shown) when the user is operating wheelchair 100 in a dimly lit area. Such reflectors 300 may include, but are not limited to, reflective tape or other devices having similar functionality.

When wheel cover 200 is positioned as shown in FIGS. 4A and 4B, pad(s) 206B are disposed so as to contact surface 400 upon which wheel 108 rests. Thus positioned, pad(s) 206B facilitate traction of wheel 108 as wheel 108 rolls over various surfaces. As discussed above, seams 206A (not shown) may be used in place of, or in addition to, pad(s) 206B. Alternatively, seams 206A and pads 206B may be eliminated altogether.

Finally, when secured about wheel 108 as shown in FIG. 4B, wheel cover 200 serves to substantially confine foreign material present on, or embedded in, tread 108A and/or sidewalls 108B, thereby preventing such foreign material from passing through, or penetrating, outer surface 206. Or, where wheel cover 200 is employed to protect a clean wheel 108, wheel cover 200 serves to substantially prevent foreign materials from coming into contact with wheel 108. Thus, wheel cover 200 is effective in, among other things, preventing contamination of surfaces, such as surface 300 (FIGS. 4A and 4B), aiding in the prevention of injury or harm to the wheelchair user, and/or to others, that could result from contact with foreign material present on wheel 108, and preventing foreign matter contact with wheel 108.

Finally, in one alternative embodiment, wheel cover 200 comprises two semi-rigid, semicircular sections configured to be removably attached to each other, such as by way of a hook-and-loop type fastener. Alternatively, the two semi-rigid, semicircular sections may be configured in a clamshell type arrangement where a first end of one section is rotatably pinned to a first end of the other section, while the respective second ends remain free but may be removably attached to each other.

The semicircular sections may be composed of materials such as vinyl, rubber, or plastic and generally are sized to fit about the particular wheel with which they are to be used. These semicircular sections may also include various features directed to facilitating suitable traction, such as rubber pads, grooves, or various types of treads or protrusions. In some embodiments, the semicircular sections may include various friction enhancing structures that contact the wheel about which the wheel cover is to be disposed so as to reduce or eliminate slippage between the wheel cover and the wheel. Further, the semicircular sections may also comprise materials that afford adequate traction while also tending to shed foreign matter such as animal waste, food, and petroleum products.

The present invention may be embodied in other specific forms without departing from its spirit or essential characteristics. The described embodiments are to be considered in all respects only as illustrative and not restrictive. The scope of the invention is therefore described by the appended claims rather than by the foregoing description. All changes which come within the meaning and range of equivalency of the claims are to be embraced within their scope.

What is claimed is:

1. For use in conjunction with a wheel having a tread arranged for contact with an operating surface, a wheel cover, comprising:

(a) a cover portion so dimensioned as to be capable of enclosing a substantial portion of the tread;

(b) means for removably attaching said cover portion to the wheel; and (c) at least one item selected from the group consisting of: seams and pads, said at least one item helping to minimize slippage of the wheel with respect to the operating surface when the wheel cover is attached to the wheel.

2. The wheel cover as recited in claim 1, wherein at least said cover portion substantially comprises fabric.

3. The wheel cover as recited in claim 1, wherein said cover portion includes first and second opposing ends that are disposed proximate each other when the wheel cover is attached to the wheel.

4. The wheel cover as recited in claim 1, wherein said means for removably attaching said cover portion to the wheel comprises a plurality of straps each having a first end attached to a first edge of said cover portion, and each of said plurality of straps further including a second end configured to be removably attached to a second edge of said cover portion.

5. The wheel cover as recited in claim 1, wherein said means for removably attaching said cover portion to the wheel comprises a first drawstring disposed proximate a first edge of said cover portion, and a second drawstring disposed proximate a second edge of said cover portion, each of said drawstrings including a cinching device.

6. The wheel cover as recited in claim 1, further comprising a barrier attached to said cover portion.

7. The wheel cover as recited in claim 1, wherein said cover portion is of unitary construction.

8. A wheelchair suitable for use on an operating surface, comprising:

(a) a frame having a seat attached thereto;

(b) a plurality of wheels attached at least indirectly to said frame, each of said plurality of wheels having a running surface configured for contact with the operating surface; and (c) a plurality of wheel covers, each of said plurality of wheel covers corresponding with, and being removably attached to, a respective wheel, and including:

(i) a cover portion so dimensioned as to be capable of enclosing a substantial portion of said running surface of that wheel to which said wheel cover corresponds; and (ii) means for removably attaching said cover portion to that wheel to which said wheel cover corresponds.

9. The wheelchair as recited in claim 8, further comprising a barrier attached to said cover portion.

10. The wheelchair as recited in claim 9, wherein said barrier is substantially impermeable by at least water and water-based materials.

11. The wheelchair as recited in claim 8, further comprising a means for facilitating traction, said means for facilitating traction helping to minimize slippage of the wheel with respect to the operating surface when the wheel cover is attached to the wheel.

12. The wheelchair as recited in claim 8, wherein at least said cover portion substantially comprises fabric.

13. The wheelchair as recited in claim 12, wherein said fabric substantially comprises nylon.

14. The wheelchair as recited in claim 8, wherein said means for removably attaching said cover portion to the wheel comprises a plurality of straps each having a first end attached to a first edge of said cover portion, and each of said plurality of straps further including a second end configured to be removably attached to a second edge of said cover portion.

15. The wheelchair as recited in claim 8, wherein said cover portion comprises at least two discrete sections removably attachable to each other and substantially comprising at least one material selected from the group consisting of: vinyl, rubber, and plastic.

16. The wheel cover as recited in claim 8, wherein said cover portion is of unitary construction.

17. For use in conjunction with a wheel having a tread, a wheel cover, comprising:

(a) a cover portion having inner and outer surfaces and so dimensioned as to be capable of enclosing a substantial portion of the tread;

(b) a barrier connected to said cover portion; and (c) a plurality of straps each having a first end attached to a first edge of said cover portion, and each of said plurality of straps further including a second end configured to be removably attached to a second edge of said cover portion.

18. The wheel cover as recited in claim 17, wherein said cover portion substantially comprises fabric.

19. The wheel cover as recited in claim 18, wherein said fabric substantially comprises nylon.

20. The wheel cover as recited in claim 17, wherein said barrier is substantially impermeable to water and water-based materials.

21. The wheel cover as recited in claim 17, wherein said cover portion is of unitary construction.

22. The wheel cover as recited in claim 17, wherein said barrier is integral with said cover portion.

23. The wheel cover as recited in claim 17, wherein said cover portion comprises a plurality of discrete sections removably joined together in an end-to-end arrangement.

24. The wheel cover as recited in claim 1, wherein said fabric substantially comprises nylon.

25. The wheel cover as recited in claim 1, wherein said barrier is substantially impermeable by at least water and water-based materials.

26. The wheel cover as recited in claim 1, wherein said barrier substantially comprises at least one material selected from the group consisting of: plastic, vinyl, and rubber.

27. The wheel cover as recited in claim 1, wherein said barrier is integral with said inner surface of said cover portion.

28. The wheel cover as recited in claim 1, further comprising a means for facilitating traction, said means for facilitating traction helping to minimize slippage of the wheel with respect to the operating surface when the wheel cover is attached to the wheel.

29. The wheel cover as recited in claim 28, wherein said means for facilitating traction comprises at least one item selected from the group consisting of: seams and pads.

30. For use in conjunction with a wheel having a tread arranged for contact with an operating surface, a wheel cover suitable for use with at least one of the wheels, the wheel cover comprising:

(a) a cover portion of unitary construction and including inner and outer surfaces, said cover portion substantially comprising fabric and being so dimensioned as to be capable of enclosing a substantial portion of the tread;

(b) a barrier connected to said inner surface; and (c) a plurality of straps each having a first end attached to a first edge of said cover portion, and each of said plurality of straps further including a second end configured to be removably attached to a second edge of said cover portion.

31. The wheel cover as recited in claim 30, further comprising at least one reflector disposed proximate said outer surface of said cover portion.

32. The wheel cover as recited in claim 1, wherein said cover portion comprises a plurality of discrete sections attached to each other.

33. The wheel cover as recited in claim 1, wherein said cover portion comprises a plurality of discrete semi-rigid sections attached to each other.

34. The wheel cover as recited in claim 1, wherein said means for removably attaching said cover portion to the wheel comprises a first drawstring disposed proximate a first edge of said cover portion, and a second drawstring disposed proximate a second edge of said cover portion, each of said drawstrings including a cinching device.

* * * * *

UNITED STATES PATENT AND TRADEMARK OFFICE

CERTIFICATE OF CORRECTION

PATENT NO. : 6,598,947 B2 
DATED : July 29, 2003
INVENTOR(S) : Roland R. Hannah

It is certified that error appears in the above-identified patent and that said Letters Patent is hereby corrected as shown below:

Title page,
Item [56], References Cited, U.S. PATENT DOCUMENTS, insert the following references:

| | | | |
|---|---|---|---|
| -- 6,116,415 | 9/2000 | Rastelli | 206/304.1 |
| 5,865,180 | 2/1999 | Sigfrid | 128/845 |
| 5,675,839 | 10/1997 | Gordon et al. | 2/159 |
| 5,624,509 | 4/1997 | Stanley | 152/213R |
| 5,170,826 | 12/1992 | Carstensen et al. | 150/154 |
| 5,121,938 | 6/1992 | Gross et al. | 280/304.1 |
| 5,044,411 | 9/1991 | Doll | 152/208 |
| 4,754,987 | 7/1988 | Williams | 280/289 |
| 4,693,289 | 9/1987 | Taylor et al. | 150/52R |
| 4,530,386 | 7/1985 | Nakahira | 152/315 |
| 4,449,561 | 5/1984 | Head | 152/213R |
| 4,429,068 | 1/1984 | Nakahira | 524/302 |
| 4,366,964 | 1/1983 | Farey et al. | 380/242 |
| 4,321,955 | 3/1982 | Rieger et al. | 152/171 |
| 4,215,733 | 8/1980 | Rieger et al. | 152/171 |
| 3,807,473 | 4/1974 | Gillham | 152-190-- |

Item [57], ABSTRACT,
Line 2, change "includes" to -- comprises --

Column 3,
Line 66, after "orientation" insert -- of an --

Column 7,
Lines 39, 41 and 44, after "drawstrings" insert -- 216 --
Line 42, after "device" insert -- 218 --

Signed and Sealed this

Twenty-eighth Day of September, 2004

JON W. DUDAS
*Director of the United States Patent and Trademark Office*